Sept. 14, 1926.   1,599,457
P. A. CHALEIL
FUEL BURNER
Filed Oct. 13, 1924   3 Sheets-Sheet 1
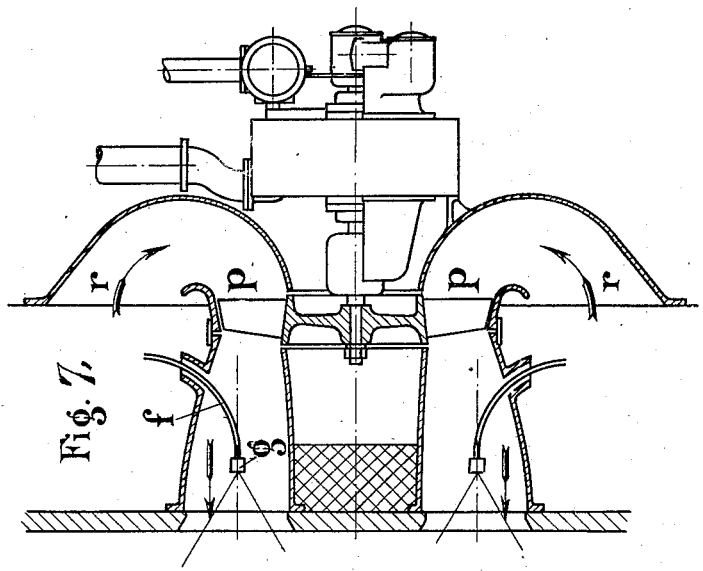
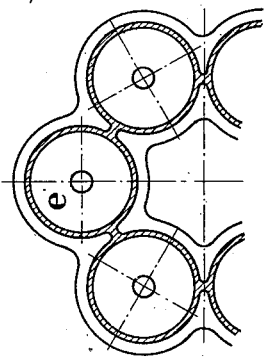
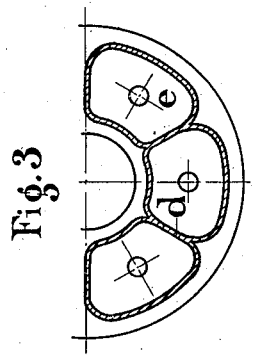
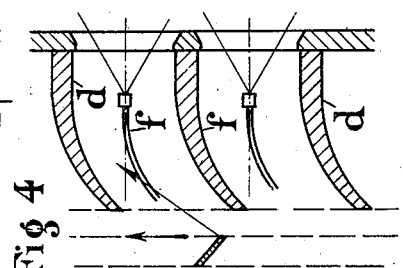
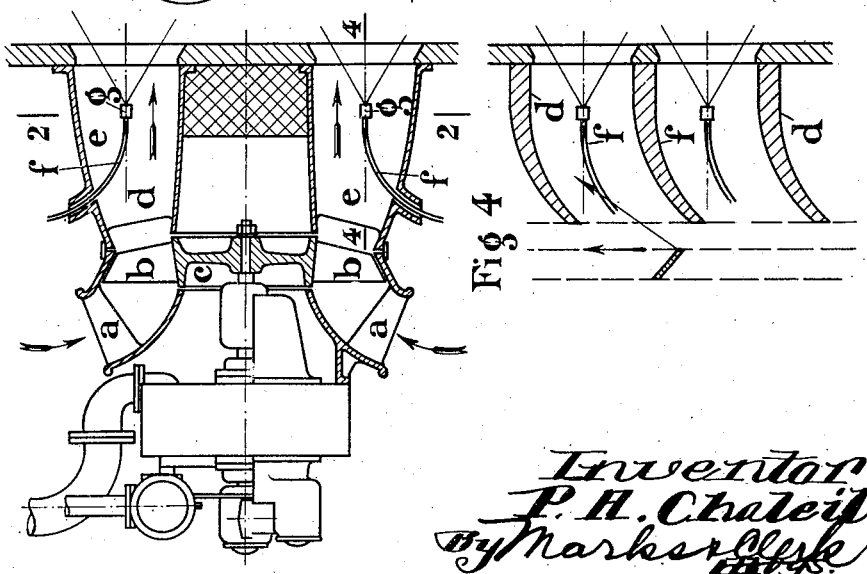

Sept. 14, 1926. 1,599,457
P. A. CHALEIL
FUEL BURNER
Filed Oct. 13, 1924   3 Sheets-Sheet 2
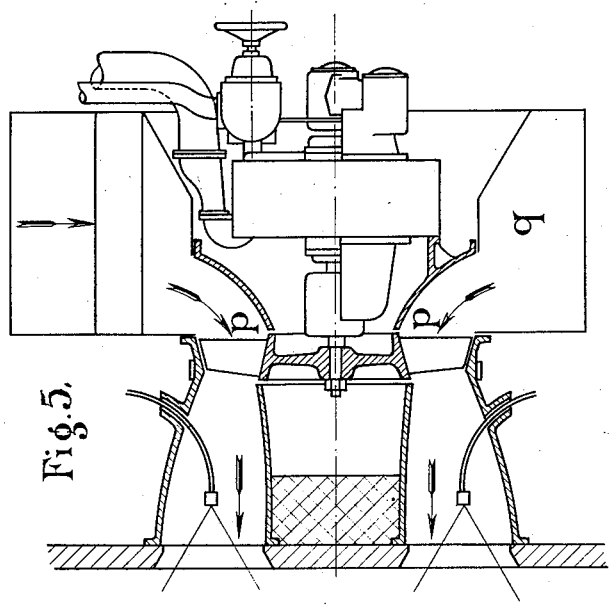
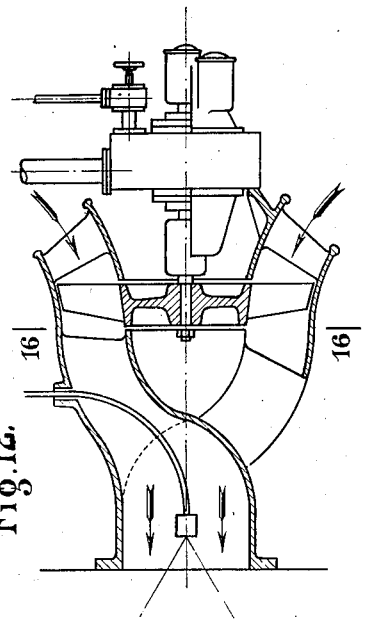
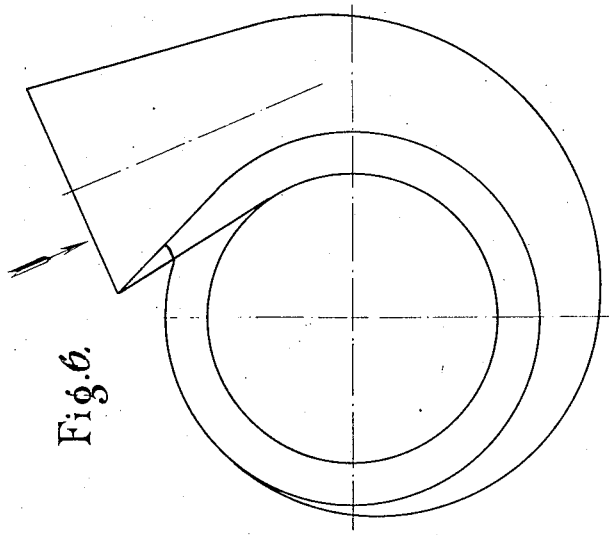
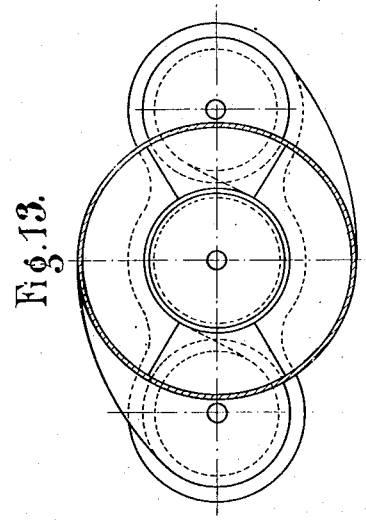

Sept. 14, 1926.
P. A. CHALEIL
FUEL BURNER
Filed Oct. 13, 1924   3 Sheets-Sheet 3
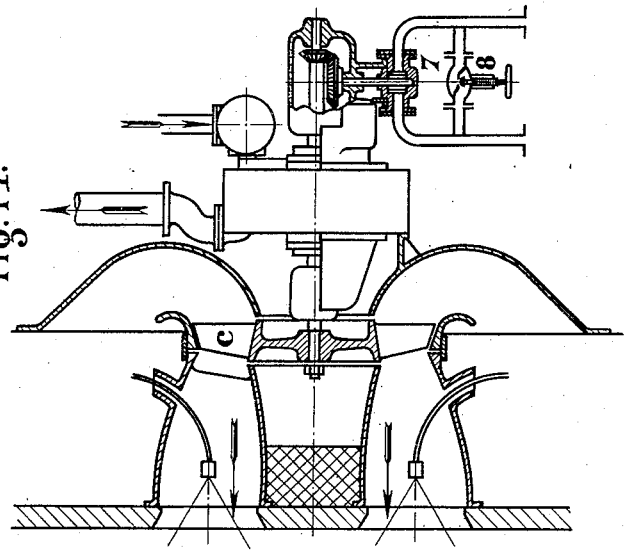
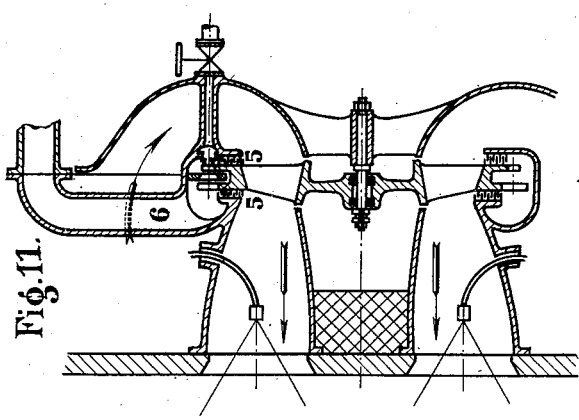
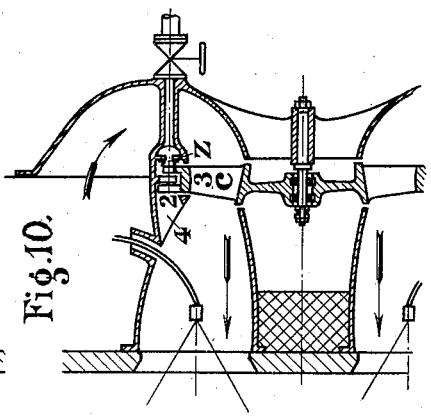
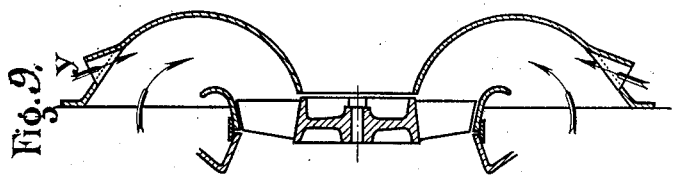
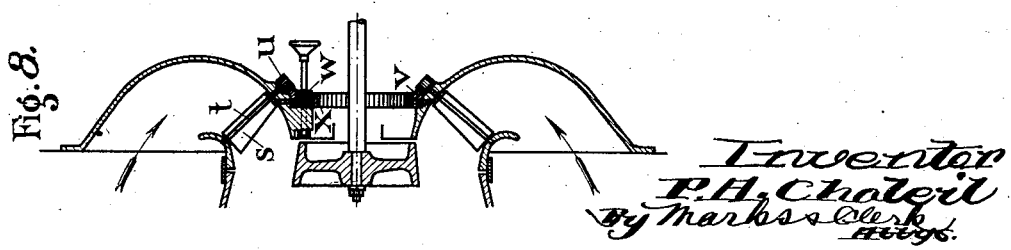

Patented Sept. 14, 1926.

1,599,457

UNITED STATES PATENT OFFICE.

PAUL ALEXIS CHALEIL, OF PARIS, FRANCE, ASSIGNOR TO SOCIÉTÉ RATEAU, OF PARIS, FRANCE.

FUEL BURNER.

Application filed October 13, 1924, Serial No. 743,450, and in France February 2, 1924.

This invention relates to improvements in blowers for boilers fired with liquid or powdered fuel, by means of fans and burners, the chief object of the invention being to obtain good combustion with a plant which relatively is very much smaller and lighter than heretofore.

The improved apparatus is characterized by the fact that the air delivered by the fan is distributed between the lanterns of several burners in such a way as to enable the number of feed apparatus in a given range of boilers to be reduced whilst nevertheless serving to feed a large number of burners simultaneously.

The apparatus also comprises several devices the application of which facilitates the attainment of a good embodiment of the invention, which devices are hereinafter described and are illustrated, by way of example, in the accompanying drawings, in which:

Figure 1 represents a vertical axial section of one form of the apparatus.

Figure 2 is a section on line 2—2 of Figure 1.

Figure 3 is a section of a modification.

Figure 4 is a plane projection of a section of the diffusers or casings taken through the cylinder containing the delivery axes of the burners.

Figure 5 is a vertical axial section of a spiral air distributor mounted at the intake of an apparatus similar to that shewn in Figures 1 and 2.

Figure 6 is a front elevation of this spiral distributor viewed from the boiler gangway.

Figure 7 is an axial section of an annular distributor, mounted on an apparatus similar to that of Figures 1 and 2.

Figure 8 is an axial section of a helicoidal distributor with adjustable vanes, intended to be placed on the air intake of the fan.

Figure 9 is an axial section of a nozzle arranged on the fan intake, for the purpose of producing suction in a place other than the space supplying air to the fan.

Figure 10 is an axial section of an arrangement for driving the fan by means of a compressed-air motor.

Figure 11 is a similar view of an arrangement for driving the fan with a special steam turbine.

Figure 12 is a vertical section through the axis of a fan supplying air to three burners.

Figure 13 is a section on line 16—16 of Figure 15.

Figure 14 is an axial section of a special arrangement for supplying the burners with liquid fuel.

In the example illustrated in Figure 1 the air is drawn directly from the boiler gangway by the ventilator $a$, and is propelled by the vanes $b$ of the fan rotor $c$. The air is then divided into six separate streams by the partitions $d$, the mouth-end of each of which is in the shape of a spoon and is constructed so as fully to maintain the velocity of the air. These partitions $d$ separate six passages $e$, the cylindrical extremity of each of which serves as a combustion casing. In this example it is assumed that the heating is effected with a liquid fuel supplied to the axis of each casing by a burner $f$, the nozzle $g$ of which ensures the atomization of the fuel as a stream in the combustion chamber.

The velocity imparted to the air by the fan rotor is utilized directly in the combustion casings. The aspiration of the air may be effected in any desired manner, known or otherwise, and in particular by one of the devices hereinafter described. The shape of the fan and burners may differ from those shewn in Figure 1. In that figure the fan is helicoidal, but it may, in certain cases, be helico-centrifugal or centrifugal. The number of casings supplied with air from the same fan may vary. The motor shewn is a direct-coupled steam turbine, but it should be understood that the fan may be driven by any kind of motor; geared turbine, electromotor, steam engine or compressed-air-motor. In particular, the fan may be driven by the action of compressed air or steam impinging on vanes provided on the perimeter of the fan rotor, according to the description of Figures 10 and 11.

The sectional view, Figure 2, shews that the part in front of the casings is of circular section.

In the modification according to Figure 3, this section is of different shape, which enables the sectional area of the air passages to be increased whilst retaining the same overall dimensions.

Figure 4 is a plane projection of a section of the casings, taken on line 4—4 of Figure 1, said projection shewing, by way of example, the section of the partitions $d$ and the position of the burners $f$.

In the apparatus shewn in Figure 8, which is substantially similar to that shewn in Figure 1, the fan intake $p$ is fed by a spiral distributor $q$.

In Figure 6 the spiral distributor offers the advantage of ensuring a regular supply to the intake by means of a suction-trunk adapted to lead inwards from outside; on the other hand it imparts to the air a preliminary gyratory motion which may supplement or oppose that created by the fan rotor.

In the apparatus shewn in Figure 7, the intake $p$ is fed by an annular distributor $r$; an arrangement which enables the fan or fans mounted on the front of the boiler to be fed with a stream of air enclosed, for example, between the two walls of the boiler.

According to Figure 8, the adjustable vanes $s$ are adapted to turn around the shaft $t$, under the action of the pinion $u$, driven by the crown wheel $v$ which is adapted to be actuated by the pinion $w$ acting on the teeth of the rack $x$.

In the arrangement shewn in Figure 9, a nozzle $y$ discharges into the fan intake. The suction-effect set up by the fan rotor enables air to be drawn through said nozzle from the space with which it communicates. This device may be adopted, either for ventilating a space, the boiler gangway for example, or for drawing off the noxious gases which may escape from the furnace into the jacket space of the boiler.

In Figure 10, the fan rotor $c$ is driven by the action of compressed air expanding in the nozzles $z$ and acting on the vanes 2 arranged on the rim 3 of the fan. After acting on said vanes, the operating air escapes through the nozzle 4 into the delivery pipe of the fan, where it mixes with the air discharged from the fan. This nozzle may be designed in such a manner as to enable the residual velocity of the operating air to act, as in an injector, on the air of combustion, so as to increase the velocity or state of agitation of the latter.

In Figure 11 the operating fluid is steam in place of compressed air. The fittings 5 prevent the steam from mixing with the air of combustion. After having done its work, the steam is collected in the exhaust pipe 6.

Figure 12 and 13 represent a device similar to that of Figures 1 and 2, except that the fans supply air to three burners arranged in one plane. This same arrangement may be applied to any number of burners.

In the arrangement shewn in Figure 14, the same motor drives the fan rotor $c$ and a liquid-fuel pump 7. This arrangement gives the advantage of maintaining the fuel and combustion medium in suitable proportions for satisfactory combustion, in spite of accidental fluctuations in the speed of the motor. In fact, by using a pump which delivers a quantity of fuel proportionate to the pump speed, and a fan endowed with the same property, it is possible to ensure uniform proportion between the two fluids when the speed of the motor varies. A needle valve 8, which places the delivery pipe of the liquid-fuel pump in communication with its intake or with the storage tanks, enables the said proportion to be varied if necessary.

What I claim is:

1. In combination, a blower casing including outlet casings branched directly from the blower, a plurality of burners disposed directly in the outlet casings, a fan rotor disposed within said blower casing, the several outlet casings being arranged equidistant radially from the axis of the fan rotor and the burners being arranged equidistant from the fan rotor.

2. In combination, a blower casing including a substantially annular group of delivery branches, a plurality of burners disposed directly in the delivery branches of the blower casing, the several burners being grouped around the blower within the outlet casings thereof and the blower rotor serving in common for all the burners.

In testimony whereof I hereunto affix my signature.

PAUL ALEXIS CHALEIL.